April 28, 1964     H. E. SCHLEICHER     3,130,590
SHOCK SENSITIVE LATCH-RELEASING DEVICE
Filed April 19, 1961
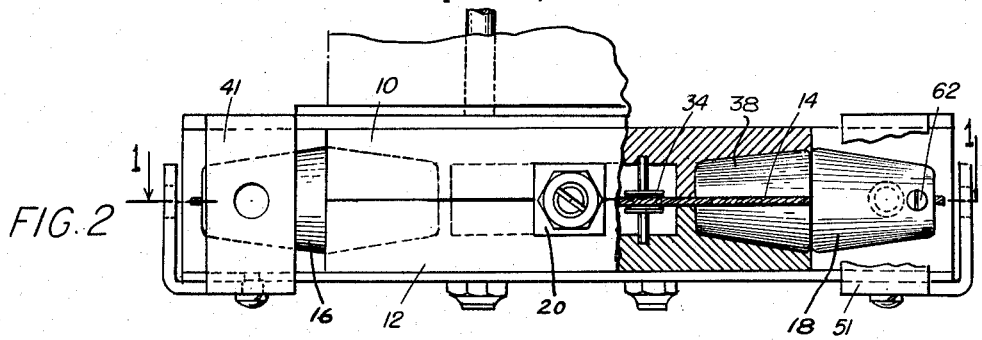
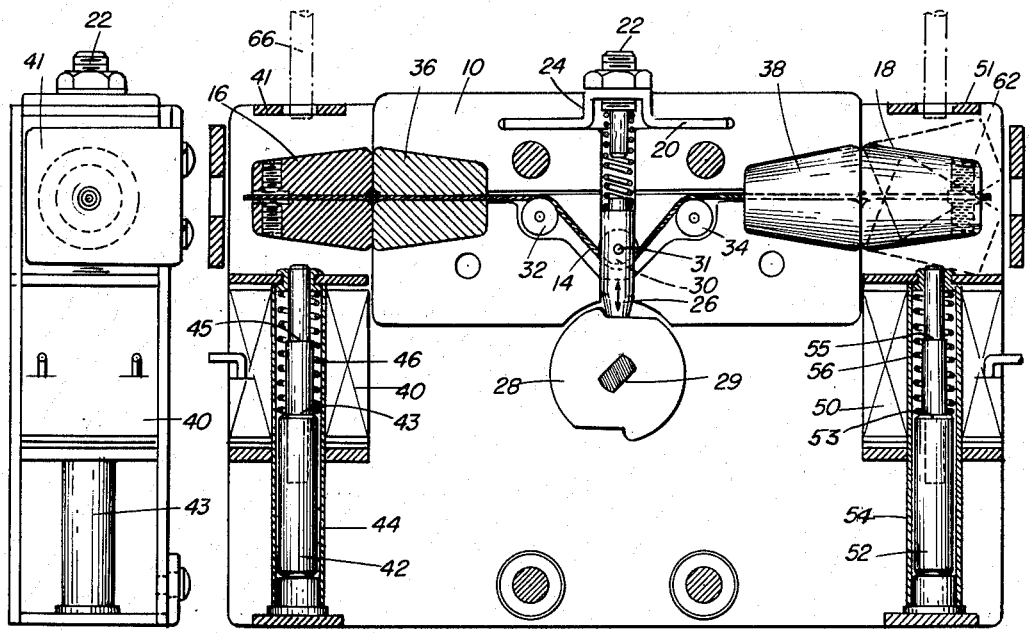
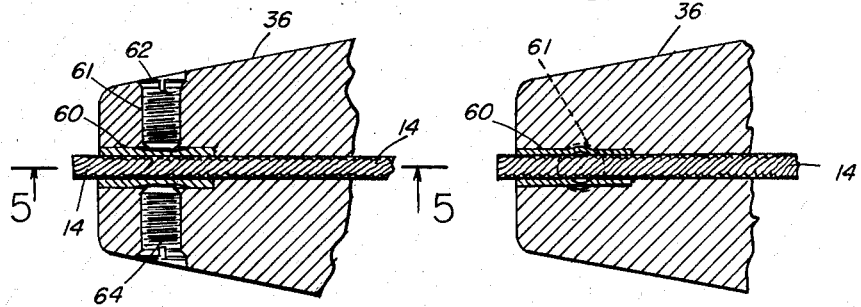
Inventor
Harold E. Schleicher
By his attorneys
Howson and Howson.

United States Patent Office 3,130,590
Patented Apr. 28, 1964

3,130,590
SHOCK SENSITIVE LATCH-RELEASING DEVICE
Harold E. Schleicher, West Hartford, Conn., assignor to The Arrow-Hart & Hegeman Electric Company, Hartford, Conn., a corporation of Connecticut
Filed Apr. 19, 1961, Ser. No. 104,117
19 Claims. (Cl. 74—2)

This invention relates to a device which is sensitive to shocks of predetermined force values and, more particularly, to provision in such a device for releasing a latch only when said predetermined shock forces are reached or exceeded.

Particularly in recent years, devices have been developed which are held closed or open or in some predetermined condition by latches or the like so as to be able to withstand severe shocks of great force values without their condition changing. It is desirable for such devices to retain such characteristics, but under some conditions it is also desirable that such devices be unlatched or released when subjected to some shock force value less than that which the device would normally withstand.

Therefore, one object of the invention is to provide a latch-releasing device which is sensitive to shock forces of predetermined value and which will become effective when such value is reached or exceeded.

Another object is to provide a device of the aforesaid type which is balanced and counterweighted in such a way as to respond equally to a shock force applied regardless of the direction of force action.

Another object is to provide for actuation of a device of the aforesaid type either manually at the device or under eletcromagnetic control from a remote point.

Another object is to provide a device of the aforesaid type which is simple in structure and made of durable readily available materials and easily manufactured parts, and which may be assembled inexpensively and taken apart for inspection or repair easily and in which duplicate parts are used to maximum advantage, thus to keep to a minimum the cost of tooling and the cost of manufacture, without sacrifice of reliability.

Other objects and advantages of the invention will appear as the invention is described in connection with the accompanying drawing.

In the drawing:

FIG. 1 is a transverse section view taken along line 1—1 of FIG. 2.

FIG. 2 is a plan view, partly broken away at the right end, of the device shown in FIG. 1.

FIG. 3 is an end elevation view of the device shown in FIG. 1.

FIG. 4 is an enlarged detail section view of one of the outside counterweights showing the means for securing the cable thereto.

FIG. 5 is an enlarged detail section view of the same outside counterweight as in FIG. 4, but with the section taken at right angles to the section of FIG. 4.

Referring to the drawing, the mechanism is conveniently mounted between oppositely facing similar molded blocks, preferably of nylon or other light-weight material having a smooth slippery surface which is in effect self-lubricating in the sense that it requires no additive for lubrication. The blocks are provided with recesses to receive the fixed and moving parts of the mechanism.

Extending through a small passage in the blocks is a stainless steel flexible wire or cable 14 having fastened on each end a truncated conical counterweight 16, 18 whose larger ends lie against the outer opposite end surfaces of the blocks 10, 12. The cable 14 is preferably of stainless steel or other similar material which will not stretch or be permanently lengthened when subjected to the stresses to which the device is designed to respond. Also preferably, the small passage and the recesses for other parts between the blocks are molded so that one half of each of the parts (as hereinafter more particularly described) will be located in each of the blocks. The molded blocks may thus be identical.

Tension is applied to the cable at its middle by a coiled compression spring 20 located in a molded bore 21 transverse to the cable passage. The spring is anchored or presses at one end against a peripheral shoulder on an adjustment screw 22 threaded through the transverse portion of a U-shaped bracket 24 having its ends bent oppositely. One half of the bracket fits into a recess shaped to fit it in the block 10 while the other half fits into a like complementary recess in the block 12.

By adjusting the position of the screw, the pressure of the spring 20 may be adjusted. The opposite end of the spring presses against a latched lug 26 in the opposite end of the transverse passage 21. Formed in the inner end of the latched lug is a diametrical slot extending longitudinally toward the middle of the lug. In the slot is located a central pulley 30 made of nylon or other light-weight material, preferably a plastic material having similar characteristics to nylon, although a light-weight metal pulley can be used.

The pulley 30 is mounted rotatably on an axle pin or thin shaft 31 extending transversely through the center of the pulley with its ends mounted in the latched lug.

The cable 14 is trained around the center pulley 30 and also around similar nylon pulleys 32 and 34 on opposite sides of the spring passage 21 and located so that the portions of the cable between the pulleys 32 and 34 and counterweights 16 and 18 are in alignment and also lie in the plane of the abutting faces of the blocks 10 and 12. For convenience, these aligned portions will be referred to as the cable axis.

Thus, the spring applies tension to the cable 14 by means of the center pulley 30. Simultaneously, it presses the latched lug 26 into position to latch and hold a biased member 28.

For the purpose of illustration, the latched member 28 is shown as a disc on a shaft 29 biased by means (not shown) in clockwise direction (referring to FIG. 1) such as the shaft on a rotary actuator, such as in my Patent 2,540,294 issued February 6, 1951. It should be understood that the invention is not limited in any respect to such use, which is mentioned merely as exemplative, but the invention may be used in connection with a rectilinearly movable latched member or any other biased latched member.

The cable passes freely through truncated conical inside counterweights 36 and 38 which are seated in aligned truncated conical recesses in opposite ends of the blocks 10 and 12.

With the foregoing structure in mind, it can be seen that pressure, such as might be caused by a sudden shock or a shock wave, exerted on the outside counterweight 18 in any direction whatsoever, except parallel to the cable axis, will have a component of force perpendicular to the cable axis tending to move the counterweight 18 laterally.

Considering the force concentrated on the center of gravity of the outside counterweight 18, the weight will be tilted about its edge upwardly or downwardly, as shown in dotted lines in FIG. 1, after reaching the limit of a very limited amount of sliding motion upon the surface of blocks 10 and 12. This will pull the cable 14, shortening the portion around the central pulley 30 and moving it and the latch contra the force of the spring 20. This will disengage the latched lug 26 from the latched member 28, releasing the latter when the force is sufficiently great.

A like condition will obtain with respect to the outside counterweight 16.

When the forces act perpendicularly to the axis of the cable and the outside counterweights 16 and 18, an equal tendency of both those counterweights to move or tilt will occur. As the force angle changes (as for example counterclockwise in FIG. 1), the components of force on the counterweight 18 parallel to the cable away from the blocks 10 and 12 will increase, but the component of force perpendicular to the cable axis will decrease. But even though the tendency to tilt may lessen, a force acting to move the weight directly away from the blocks will become effective and will increase at the same time as the angle of force increases. Thus, the tendency to shorten the portion of the cable adjacent the latched lug will continue to be exerted but in a different way.

When the force is due to a shock, the forces acting on both the outside counterweights 16 and 18 will be parallel, but the components of the force acting on one weight, such as 18, tending to move that weight away from the blocks will at the same time tend to move the weight 16 toward the block, but the components acting perpendicular to the axis will be the same in each case and will tend to tilt both the outside weights. However, the likelihood of the weight 16 tilting will be much less in view of the fact that one of the components, namely that parallel to the axis, acting upon the weight 16 in such a situation will not exert any tendency to tilt the weight.

Assuming the force to be exerted on the weight 16 at an angle of say 45°, there would be less tendency of the latch to be released than if the force acted at 90° to the axis because one horizontal component of the 45° force would become a nullity due to acting directly against the blocks 10 and 12. Therefore, to compenate for this loss, the inside counterweights 36 and 38 are provided adjacent the bases of the counterweights 16 and 18, respectively.

Since the inside counterweights 36 and 38 are loose on the cable 14, the same force which acts upon the outside counterweights 16 and 18 at a 45° angle will also act on the inside counterweights 36 and 38 at a 45° angle. The component of force acting parallel to the axis of the cable will tend to move one counterweight (assuming for example it be 38) out of its recess in the blocks and, thus, will tend to move the adjacent outside counterweight 18 away from the blocks adding to the tendency of the counterweight 18 to shorten the portion of the cable around the central pulley 30.

When the inside counterweight 38 moves to any extent outwardly of its recess, it will add to the pull on the cable and if that counterweight tilts to any extent within its recess, it will bend the cable adding still further to the tendency to shorten upon the central portion thereof and, thus, increasing the latch-releasing action.

A force acting to tend to move the counterweight 38 out of its recess will, if similarly applied to the counterweight 36, have no effect on the latch-releasing action because the counterweight 36 will in such instance be inactive and ineffective. However, if the force be rotated 90° so as to be applied at a 45° angle in the opposite direction to that first described, the actions just described in connection with the counterweights 38, 18 and 16 will apply but in a similar manner, but oppositely to the counterweights 36 and 16 and to the counterweight 18.

Thus, no matter in what direction a force, such as a shock wave, acts upon the device, the tendency to unlatch the latched member 28 will be the same.

The amount of mass of the latched lug 26 is so small with respect to the total mass of all of the counterweights that whether the force acted upwardly (referring to FIG. 1) at 90° to the cable axis or downwardly at 90° to the case axis, the effect would be substantially the same; and if the forces acted at an angle, the mass of the latched lug 26 would be even less likely to affect the action.

Since it may be desired on some occasions to release the latch from a remote point, a pair of identical electromagnetic solenoids 40 and 50 are mounted upon similar frames, designated generally by the numerals 41 and 51, attached to the opposite ends of the blocks 10 and 12. Core armatures 42 and 52, respectively, are mounted within the solenoids 40 and 50 sliding within sleeves 43, 53 and are biased normally away from the counterweights 16 and 18 by coiled compression springs 46 and 56. The core armatures 42 and 52 may be progressively reduced in diameter along their lengths to form steps or shoulders 43, 53 and 45, 55, respectively, which act, on the one hand, as seats for the coiled compression springs and, on the other hand, as stops for the outward motion of the core armatures when the solenoids are energized.

It will be readily apparent that upon energization of the solenoids, the core armatures will be attracted and strike against the counterweights 16 and 18 accomplishing the same latch-releasing action as when a shock wave occurs. The solenoids will have no undesired effect on the action of the device when the shock wave occurs since if the shock wave acts in the same direction as the coil springs 46 and 56, the armatures will be inoperative for latch-releasing; and if the wave acts against the force of the springs, the core armatures could only move outwardly, as when energized, and add to the desired latch-tripping effect. The strength of the springs 46, 56 will be such as to prevent outward or tripping action of the armatures below a predetermined shock level.

The amount of force required to actuate the device can be determined by the strength of the latch biasing spring 20 and by the mass of the counterweights and the degree of movement required to disengage the latched lug 26 from the latched member 28. For example, if it were desired that the device should not be actuated and the latch-releasing action should not occur until a force of about five times gravity occurred, a spring having the desired force, when adjusted, would be provided and the counterweights would be calculated as to mass so that any force about 5 G's would actuate the device. Normally a considerable amount of leeway is allowed so that the device might be designed for actuation of between 5 and 8 G's or between 8 and 10 G's and without much difficulty.

It is also necessary that the cable be firmly anchored in the counterweights 16 and 18. For that purpose, a small short sleeve 60 of copper or other soft easily deformable metal is slipped on the end of the cable within an enlargement in the outer end of the counterweight.

Transverse radial bores 61 are formed in the counterweights adjacent the sleeve 60, in which are threaded set screws 62, 64 whose ends are truncated. The diameters of the set screws and their bores are greater than the diameter of the passageway for the cable through the counterweight. Hence, at the intersection of the bores of the set screws 62, 64 with the passageway for the cable there is a space available into which the metal of the sleeve may move or flow as the set screws 62, 64 are tightened and squeeze the sleeve from opposite sides. Thus, the sleeve firmly grips the cable under the stress of the force applied by the screws 62, 64 and the sleeve is anchored against the movement axially within the counterweight.

Manual operation may be provided by twin plungers 66 in substantial alignment with the armatures 42, 52, but on the opposite side of the weights 16 and 18 respectively. For joint operation, the plungers 66 may be joined by a transverse connecting bar, all as shown in dot-dash lines in FIG. 1. Any suitable guiding and biasing means may be provided for the plungers 66 to bias them away from the weights.

Many modifications within the scope of the invention will occur to those skilled in the art. Therefore, the invention is not limited to the specific form and structure described.

What is claimed is:

1. In a device responsive to predetermined shock values, a base recessed to receive fixed and movable parts of the device, a holding member mounted on said base, means biasing said member into a certain position, shock responsive means including a plurality of weight masses movable to move said holding member from said certain position in response to a predetermined shock force value irrespective of the force direction, and a flexible connection between said weight masses and said holding member for moving the latter in response to said predetermined shock force value.

2. In a device responsive to predetermined shock values, a base recessed to receive fixed and movable parts of the device, a member mounted on said base and normally acting to hold another member in a predetermined position, shock responsive means including a plurality of weight masses movable to cause first-mentioned member to release said other member in response to a predetermined shock force value irrespective of the force direction, and a flexible connection between said weight masses and said holding member for moving the latter in response to said predetermined shock force value.

3. A device as claimed in claim 2 wherein the shock responsive means includes equal weight masses, one being affixed on each end of said flexible connection.

4. A device as claimed in claim 3 having means rendering one of said weight masses ineffective under action of a force in one direction parallel to the axis of said flexible connection.

5. A device as claimed in claim 4 wherein the shock responsive means includes first and second weight masses, the first masses being affixed to the opposite ends of said flexible connection, a second weight mass being associated with each first weight mass and acting in concert with it to compensate for any ineffectiveness of the one of said first masses under forces acting in certain directions.

6. A device as claimed in claim 5 wherein all the weight masses are substantially equal.

7. A device as claimed in claim 6 wherein the weight masses are dynamically symmetrical and their axes of dynamic symmetry are aligned.

8. A device as claimed in claim 7 wherein the flexible connection has a deviated portion acting on said holding member and wherein the weight masses move under shock to alter said deviated portion and move said holding member.

9. A device as claimed in claim 2 wherein the flexible connection has a deviated portion acting on said holding member and wherein the shock responsive means moves under shock to alter said deviated portion and move said holding means.

10. A device as claimed in claim 2 wherein the shock responsive means includes first and second weight masses, the first masses being affixed to the opposite ends of said flexible connection, a second weight mass being associated with each first weight mass and acting in concert with it to compensate for any ineffectiveness of the one of said first masses under forces acting in certain directions.

11. A device as claimed in claim 10 wherein the flexible connection has a deviated portion acting on said holding member and wherein the shock responsive means moves under shock to alter said deviated portion and move said holding means.

12. A device as claimed in claim 2 wherein the shock responsive means includes equal weight masses affixed on the end of said flexible connection, and wherein the shock responsive means includes first and second weight masses, the first masses being affixed to the opposite ends of said flexible connection, a second weight mass being associated with each first weight mass and acting in concert with it to compensate for any ineffectiveness of the one of said first masses under forces acting in certain directions.

13. A device as claimed in claim 12 wherein the weight masses are dynamically symmetrical and their axes of dynamic symmetry are aligned.

14. A device as claimed in claim 2 having manually controlled means actuatable in absence of shock force to move said shock-responsive means and operate the device.

15. A device as claimed in claim 14 wherein said shock-responsive means has two parts, and said manually controlled means includes electromagnetically operated means engageable with at least one of said parts to operate the device.

16. A device as claimed in claim 2 having means biasing said holding member, and means to adjust said biasing means for varying the response of said holding to shock forces.

17. A device as claimed in claim 2 wherein the flexible connection has a deviated portion acting on said holding member and wherein the shock-responsive means move under shock to alter said deviated portion and move said holding member, and means biasing said holding member, and means to adjust said biasing means for varying the response of said holding to shock forces.

18. A device as claimed in claim 3 wherein said weight masses are conical and tiltable about their base edge.

19. A device as claimed in claim 2 wherein the shock responsive means includes first and second weight masses, the first masses being affixed to the opposite ends of said flexible connection, a second weight mass being associated with each first weight mass and acting in concert with it to compensate for any ineffectiveness of the one of said first masses under forces acting in certain directions, said second weight masses being located in recesses of the same shape as themselves in said base.

References Cited in the file of this patent

UNITED STATES PATENTS

| 1,777,665 | Gibson | Oct. 7, 1930 |
| 2,178,159 | Battestin et al. | Oct. 31, 1939 |
| 2,783,321 | Richardson | Feb. 26, 1957 |
| 2,966,562 | McElvain | Dec. 27, 1960 |